United States Patent [19]

Heintz et al.

[11] Patent Number: 4,638,714
[45] Date of Patent: Jan. 27, 1987

[54] CANNON WITH LONGITUDINALLY SHIFTABLE BARREL

[75] Inventors: Wolfgang Heintz; Manfred Pehker, both of Duesseldorf; Josef Metz, Neuss, all of Fed. Rep. of Germany

[73] Assignee: Rheinmetall GmbH., Duesseldorf, Fed. Rep. of Germany

[21] Appl. No.: 445,453

[22] Filed: Nov. 30, 1982

[30] Foreign Application Priority Data

Dec. 5, 1981 [DE] Fed. Rep. of Germany ....... 3148265

[51] Int. Cl.[4] ............................................. F41D 11/24
[52] U.S. Cl. .................................. 89/37.01; 89/14.05; 89/37.07; 89/37.14
[58] Field of Search .................. 89/161, 162, 177, 178, 89/14 R, 37 R, 37 A, 37 K, 37 E, 37 GM, 42 R, 42 B

[56] References Cited

U.S. PATENT DOCUMENTS

| 851,485 | 4/1907 | Benét et al. ........................... 89/37 E |
| 1,379,543 | 5/1921 | Finckh ................................... 89/37 E |
| 2,125,892 | 8/1938 | Dabrasky ............................... 89/37 E |
| 4,397,217 | 8/1983 | Hupp ..................................... 89/177 |
| 4,448,108 | 5/1984 | Moller et al. ......................... 89/37.01 |

FOREIGN PATENT DOCUMENTS 3013988 10/1981 Fed. Rep. of Germany .

Primary Examiner—Deborah L. Kyle
Assistant Examiner—John S. Maples

[57] ABSTRACT

A cannon barrel assembly has a barrel member centered on and extending along a barrel axis, a barrel tube member generally coaxially surrounding the barrel and having a pair of axially opposite tube muzzle and breech ends, and respective muzzle and breech bearings at the tube ends axially displaceably supporting the barrel member therein. At least one of the bearings comprises two lower and one upper segmental slide elements generally angularly equispaced about the axis and radially set in one of the members against axial displacement therein. The two lower elements are also set in the one member against radial displacement therein while the upper element is limitedly radially displaceable in the one member. Springs braced between the one member and the upper slide element urge same radially against the other member in surface contact therewith and thereby urge the two lower slide elements in surface contact against the other member also.

16 Claims, 4 Drawing Figures

CANNON WITH LONGITUDINALLY SHIFTABLE BARREL

FIELD OF THE INVENTION

The present invention relates to a large-bore gun. More particularly this invention concerns a cannon with a barrel that is axially shiftable in a barrel tube.

BACKGROUND OF THE INVENTION

The barrel of a cannon extends along a barrel axis on which is centered a barrel tube surrounding and holding the cannon. The barrel can move limitedly axially in this tube, which itself can be pivoted on the carriage supporting it about orthogonal vertical and horizontal axes that intersect each other and the barrel axis at a common point. Pivoting of the barrel about the horizontal axis is for elevation aiming and about the vertical axis is for azimuth aiming. Shifting along the barrel axis is necessary for absorbing recoil and, on some guns, for reloading operations.

In a standard large-bore gun where the barrel shifts axially back with each shot, it is of course absolutely essential that this shifting be purely axial, wholly devoid of any radial component, or the shot will surely miss.

Accordingly it has been suggested to support the barrel in the barrel tube on slide bearings at the front or muzzle end and at the rear or breech end of the barrel tube. These bearings must very snugly engage the barrel to prevent any canting in the barrel tube. As a result they must be painstakingly fitted in place. Such a snug fit wears rapidly, especially as the barrel expands and contracts as it heats and cools during use, so that either shooting accuracy suffers, or the slide joint must be frequently adjusted and overhauled.

German patent document No. 3,013,988 filed Apr. 11, 1980 by R. Moller and G. Scharting suggests a system wherein the muzzle and breech ends of the barrel tube are each provided with a set of rollers. Normally three angularly equispaced rollers are used, all pivotal about axes lying in a common plane perpendicular to the barrel axis. The rollers are hyperboloidal, with radii of curvature equal to that of the barrel so they engage same in line contact at the above-mentioned plane. To compensate for wear one of the rollers of each set is carried in mounts that can be shifted radially of the barrel axis to move the respective roller radially in or out. In addition the mount for this movable roller is provided with springs which maintain a minimal radially inwardly directed pressure on the roller to keep the joint tight.

Such an arrangement has two main disadvantages. First of all the rollers normally slip at the start, since the barrel initially moves at great speed and the inertia of the rollers must be overcome. Thus there is a problem of sticking and wearing flats on the rollers. In addition the roller assembly is quite bulky, extending radially well beyond the barrel tube. It is therefore necessary to provide a mantlet or the like to shield this extra structure, which also can be a nuisance in general when handling and using the gun.

OBJECTS OF THE INVENTION

It is therefore an object of the present invention to provide an improved barrel mount for a cannon.

Another object is the provision of such a barrel mount for a cannon which overcomes the above-given disadvantages, that is which is compact, which remains tight, and which has a long service life.

Another object is to provide such a barrel mount that can relatively easily be serviced.

SUMMARY OF THE INVENTION

These objects are attained according to the instant invention in a cannon barrel assembly shaving, as is known, a barrel member centered on and extending along a barrel axis, a barrel tube member generally coaxially surrounding the barrel and having a pair of axially opposite tube muzzle and breech ends, and respective muzzle and breech bearings at the tube ends axially displaceably supporting the barrel member therein. According to this invention at least one of the bearings comprises two lower and one upper segmental slide elements generally angularly equispaced about the axis and radially set in one of the members against axial displacement therein. The two lower elements are also set in the one member against radial displacement therein while the upper element is limitedly radially displaceable in the one member. Spring means braced between the one member and the upper slide element urge same radially against the other member in surface contact therewith and thereby urge the two lower slide elements in surface contact against the other member also.

With this system the slide joints remain tight even if the barrel swells during shooting. Thus the barrel axis will not shift appreciably even during the inevitable thermal expansion and contraction created by shooting. In addition such slide joints can have minimal radial dimensions while at the same time the surface contact, as opposed to point or line contact, insures accurate guiding of the barrel relative to the tube. If excessively worn, it is not hard to repair such a slide joint either, even right in the field.

In accordance with this invention the one member is the barrel member and the elements are urged radially outward by the spring means. In this case the one bearing also comprises a support ring coaxially surrounding the tube member and formed with respective radially outwardly open upper and lower recesses receiving the respective slide elements, a support on the support ring for the spring means, and a holding ring axially fixing the support ring on the barrel member. In addition the upper recess is axially throughgoing and the spring means includes force-transmitting pusher blocks axially flanking the upper element and at least one spring carried on the support of the support ring and operatively, that is either directly or indirectly, braced against one of the pusher blocks. The other pusher block is braced axially against the holding ring which can be threaded and screwed onto the barrel member to allow adjustment of the arrangement.

In order that the assembly be as compact as possible the spring is braced axially between the support and the one pusher block. To convert the axially directed spring force into a radially directed force, the pusher blocks have end faces axially engaging the upper element and diverging radially. Thus squeezing the upper element axially between these faces forces it radially outward. To further keep the system compact the support is U-shaped and surrounds the spring, the spring means further including a bolt carrying the spring. This bolt or a nut on it can be screwed to adjust the tension on the spring. In this system the holder and spring means lie between the tube member and the barrel member.

The lower recesses according to the invention are axially, angularly, and radially inwardly closed. In addition the lower recesses have floors with a center of curvature at the axis and edge surfaces extending in planes perpendicular to the axis and the lower elements are complementarily shaped.

It is also possible according to this invention for the one member to be the tube member and for the elements to be urged radially inward by the spring means. This tube member is formed with a lower angularly extending groove receiving the lower elements and is provided in the groove between the lower elements with a segmental spacer. The groove has axially spaced end faces in surface contact with the lower elements and perpendicular to the axis. The spring means in such a system includes at least one spring braced axially directly between the upper element and the tube member.

For smoothest operation the elements each have a face engaging the other member and formed with a lubrication groove. In addition the members and elements have interengaging surfaces at least some of which are provided with a friction-reducing covering, such as hard chromium and polytetrafluoroethylene.

DESCRIPTION OF THE DRAWING

The above and other features and advantages will become more readily apparent from the following, reference being made to the accompanying drawing in which.

SPECIFIC DESCRIPTION

Figure 1:
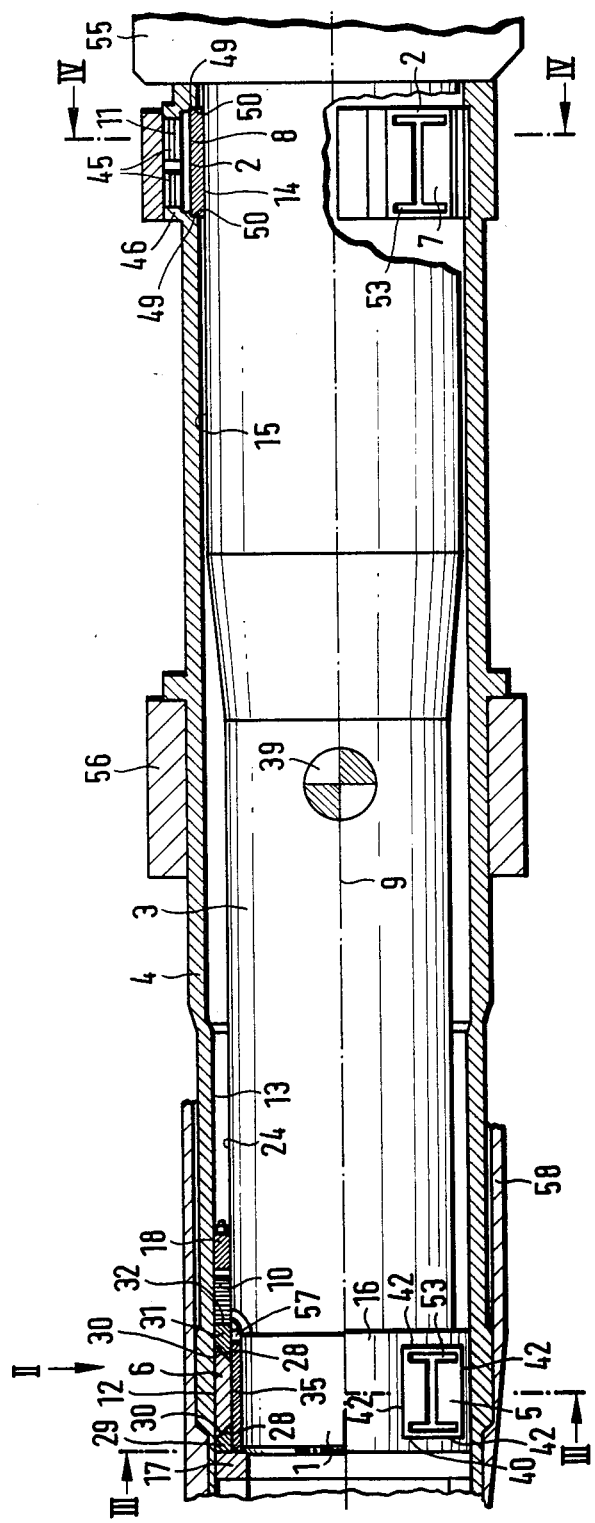
FIG. 1 is an axial section through a cannon-barrel assembly according to the invention.

As seen in FIG. 1 a gun barrel 3 is centered on a barrel axis 9 and is supported by muzzle and breech bearings 1 and 2 for limited axial movement inside a barrel tube 4. A cradle ring 56 centrally supports this tube 4 for pivoting about a horizontal elevation axis 39 as well as about an unillustrated orthogonal azimuth axis, both lying in a plane perpendicular to the axis 9. At its front end the barrel tube 4 carries a tubular shield 58 and at its rear the barrel 3 carries a breech housing 55.

Tightly fitted on the barrel 3 at the bearing 1 and held against rotation thereon by a key 57 is an inner bearing ring 16 that carries two lower and stationary slide-bearing elements 5 and an upper radially displaceable slide-bearing element 6. The elements 5 and 6 are angularly equispaced about the ring 16, are all formed with an H-shaped lubrication groove 53, and have part-cylindrical outer surfaces 43 and 12 that flatly engage a cylindrical inner surface 13 of the front portion of the tube 4.

The elements 5 are received in radially outwardly open recesses 40 of the ring 16, lying in flat contact with the floors 41 and edges 42 of the respective recesses 40 so they cannot move at all therein. Their surfaces 43 therefore rest in flat surface contact with the inner tube surface 13.

Figure 2:
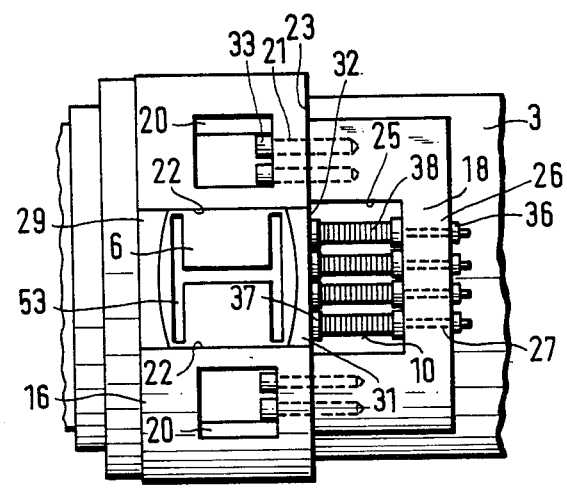
FIG. 2 is a top view of the detail indicated at with the arrow A in FIG. 1, outer parts being removed for clarity of view.
Figure 3:
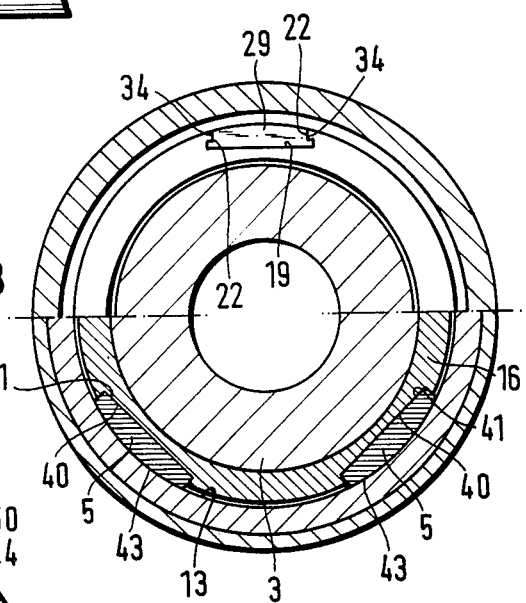
FIGS. 3 and 4 are sections taken respectively along lines 3—3 and 4—4 of FIG. 1.
Figure 4:
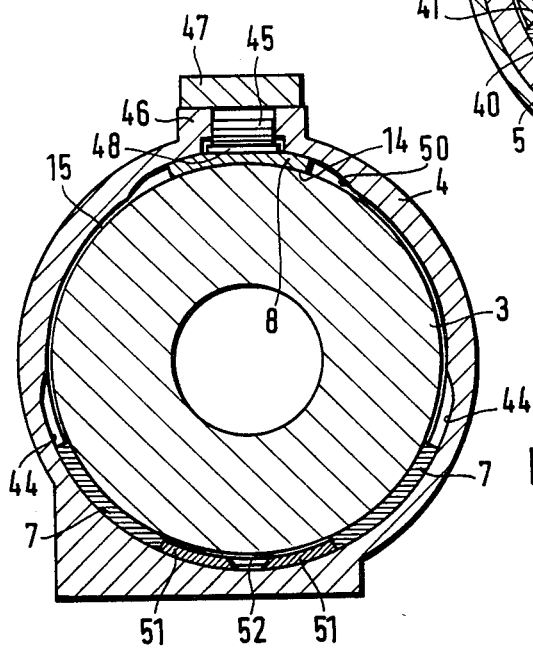

As better seen in FIGS. 2 and 3, the element 6 is axially flanked by front and back pusher blocks 29 and 31 of the same cross section, that is having grooved edges 34 interfitting with ridged edges 22 of an axially throughgoing groove 19 formed in the support ring 16. The pusher blocks 29 and 31 have end surfaces 30 flatly abutting corresponding surfaces 28 of the element 6. These surfaces 28 and 30 do not lie in planes perpendicular to the axis 9, but instead flare outward. A biasing device 10 is braced axially between a U-shaped support 18 fixed to the ring 16 and the rear end 32 of the pusher block 31. A threaded holding ring 17 (FIG. 1) threaded onto the barrel 3 in front of this ring 16 both fixes this ring 16 axially in place and bears axially backward on the front end of the pusher block 29.

The support 18 is received between an outer surface 24 (FIG. 1) of the barrel 3 behind the ring 16 and the inner surface 13 of the tube 4. This ring 16 is formed with a pair of windows 20 flanking the guide groove 19 for the pusher blocks 29 and 31. Screws 33 engage through bores 21 from these windows 20 to secure the legs of the U-shaped support 18 to an end surface 23 of the ring 16.

The biasing means 10 is formed by coil springs or stacks of spring washers 38 carried on bolts 37 engaging through holes 27 in the end or cross piece 26 of the support 18 so that the springs 38 lie in a radially throughgoing window 25 of the support 18. Nuts 36 on the outer ends of the bolts 37 can limit the force the springs 38 exert or at least define a forward end position for the pusher block 31. The axial force of the springs 38 is therefore turned into a radial force by the inclined surfaces 28 and 30 to force the slide element 6 radially out, away from floor 35 of the groove 19.

The rear or breech slide bearing 2 is formed by two lower stationary slide elements 7 and an upper radially movable element 8. The lower elements 7, like the elements 5, are formed as segments of a cylindrical ring or tube and are received in an arcuate groove 44 formed in the tube 4. Spacing segments 51 separated by a round spacer 52 lock the two elements 7 tightly in place in the groove 44.

The upper element 8 is received between the end surfaces 49 of another inwardly open groove 50. A biasing device 11 formed by two stacks of springs, here belleville washers 45, is braced radially between the outer surface of the element 8 an the inner surface of a plate 47 bolted to a radially outwardly projecting rim 46 of the tube 4. Respective bolts or pins 48 center and support the springs 45. Thus these springs 45 force the inner surface 14 against the outer surface 15 of the barrel 3.

It would of course be possible to use a bearing 2 at the muzzle end of the tube 4 or a bearing 1 at the other end without departing from the instant invention. Either way the system of this invention takes up minimal space, yet ensures a long-lived tight joint. The abutting surfaces are normally coated with lubricant, and may also have synthetic-resin coverings that further reduce friction. Ideally the elements 5, 6, 7, and 8 are all covered with hard chromium and polytetrafluoroethylene, which combination is known to have a very low coefficient of sliding friction.

What is claimed is:

1. In a cannon barrel assembly having:
   a barrel centered on and extending along a barrel axis,
   a barrel tube member generally coaxially surrounding the barrel and having a pair of axially opposite tube member muzzle and breech ends; and
   respective muzzle and breech bearings mounted at the tube member ends axially displaceably supporting the barrel therein;
   the improvement wherein at least one of the bearings comprises:

an inner bearing ring tightly coaxially fitted on said barrel;

a support on the bearing ring for the spring means;

two lower and one upper segmental slide elements generally angularly equispaced about the axis of the barrel and radially mounted in bearing ring against axial displacement therein, the two lower elements being also mounted in said the tube member against radial displacement therein, the upper element being limitedly radially displaceable in the bearing ring; and spring means braced between the supporting ring support and the upper slide element for urging said element radially outward against a confronting surface of said tube member which is in surface contact therewith and thereby urging the two lower slide elements in surface contact against the confronting surfaces of said tube member.

2. The improved cannon barrel assembly defined in claim 1 wherein the segmental slide elements each are formed with a lubrication groove.

3. The improved cannon barrel assembly defined in claim 1 wherein the slide elements have a partially cylindrical circumferentially outer surface.

4. In a cannon bearing assembly, the improvement as set forth in claim 1, wherein said bearing is disposed at the front end of the tube member.

5. The improved cannon barrel assembly defined in claim 1 wherein the tube member and slide elements have interengaging surfaces at least some of which are provided with a friction-reducing covering.

6. The improved cannon barrel assembly defined in claim 5 wherein the covering is of hard chromium and polytetrafluorethylene.

7. The improved cannon barrel assembly defined in claim 1 wherein the bearing ring coaxially surrounds the barrel and is formed with respective radially outwardly open upper and lower recesses receiving the respective slide elements;
and
  a holding ring axially fixing the bearing ring on the barrel.

8. The improved cannon barrel assembly defined in claim 7 wherein the holding ring is threaded on the barrel.

9. The improved cannon barrel assembly defined in claim 7 wherein the bearing ring and spring means lie between the tube member and the barrel.

10. The improved cannon barrel assembly defined in claim 7 wherein the lower recesses are axially, angularly, and radially inwardly closed by said two lower segmental slide elements.

11. The improved cannon barrel assembly defined in claim 10 wherein the lower recesses have floors and said lower segmental slide elememts disposed therein have circumferentially outer curved surfaces with a center of curvature at the axis and a pair of edge surfaces extending in planes parallel to the axis, the lower slide elements being complementarily shaped with respect to said lower recesses so as to matingly fit therein.

12. The improved cannon barrel assembly defined in claim 7 wherein the upper recess is axially throughgoing and the spring means includes
  force-transmitting pusher blocks axially flanking the upper element; and
  at least one spring carried on the support of the bearing ring and operatively braced against one of the pusher blocks, the other pusher block being braced axially against the holding ring.

13. The improved cannon barrel assembly defined in claim 12 wherein the spring is braced axially between the support and the one pusher block.

14. The improved cannon barrel assembly defined in claim 13 wherein the pusher blocks have end faces axially engaging the upper element and diverging radially, whereby squeezing the upper element axially between these faces forces it radially outward.

15. The improved cannon barrel assembly defined in claim 12 wherein the support is U-shaped and surrounds the spring, the spring means further including a bolt carrying the spring.

16. The improved cannon barrel assembly defined in claim 15 wherein the spring means has a nut screwable on the bolt to adjust the tension on the spring.

* * * * *